BONDING ELECTRICALLY CONDUCTIVE ELEMENTS

Filed Oct. 2, 1963

INVENTORS
LAWRENCE P. CONRAD
BY & ZOLTAN NAGY

Oscar L. Spencer
ATTORNEY

United States Patent Office 3,334,040
Patented Aug. 1, 1967

3,334,040
BONDING ELECTRICALLY CONDUCTIVE ELEMENTS

Lawrence P. Conrad, Akron, Ohio, and Zoltan Nagy, Hatboro, Pa., assignors to Pittsburgh Plate Glass Company, Pittsburgh, Pa., a corporation of Pennsylvania Filed Oct. 2, 1963, Ser. No. 313,275
17 Claims. (Cl. 204—266)

The present invention relates to bonding electrically conductive elements with a conductive cement, and particularly to its use in an alkali-chlorine cell.

In many applications in the industry, it is extremely desirable to be able to connect articles of like or different physical characteristics electrically. Such articles usually must be joined together in such a manner that electrical conductivity between the elements is of the highest degree and the strength of the bond is mechanically suitable. This is especially true in the electrochemical industries where many different conductors must be connected one to the other in applications involving the construction and operation of electrolytic cells. Thus, for example, in the construction of alkali-chlorine electrolytic cells, many electrical connections must be made within the cells between materials of different physical and chemical characteristics. Due to the fact that most cements and adhesives are di-electrics, adequate joining with cement materials has heretofore not been a practical way of connecting electrical elements in an alkali-chlorine cell. Another problem that has arisen in adding conductive materials to organic adhesives is that, when adequate quantities of conductive materials are added to insure low resistance, bond strength is lowered to an unacceptable degree. Still another difficulty is that some organic adhesives are not resistant to chlorinated brine used in alkali-chlorine cells. In addition to the inherent difficulties of non-conduction encountered in employing cement materials, certain electrical connections now employed by the electro-chemical industries are unsuitable for one or more reasons. Thus, frequently, materials which are fitted together by a pressure fit break off at the fitting. Shrink fits employed where certain soft metals are permitted to solidify around the element to be joined with a conductor may cause misalignment within the cells of the elements utilized therein (such as cell anodes) due to the thermal expansion of the soft metal during cell operation. These and other similar difficulties have given rise to a continuing need for the utilization of strong bonding materials of low cost and having electrically conductive properties.

In accordance with the present invention, a cementing composition is provided which permits the satisfactory connection of electrically conductive materials and provides a bond between these materials which is both strong and sufficiently electrically conductive to eliminate the problems of high ohmage resistance across such joints previously encountered by the prior art. In addition, the utilization of this bonding composition in alkali-chlorine cells, especially in alkali-chlorine cells of the diaphragm type, such as described in U.S. Patent No. 1,866,065, is extremely desirable, and gives rise to an anode assembly which is quite attractive from a commercial standpoint since it eliminates many of the prior art problems associated with the preparation of conventional anode assemblies. Typically, in cells of the alkali-chlorine diaphragm type, considerable equipment must be utilized to provide suitable mastic covering for the bottom portion of the cell. Also, since the electrical connection between the bus bars and the anodes inserted in these cells is made typically through a conductive lead bottom, considerable saving in both equipment handling costs and in the undesirable problem of handling large quantities of molten lead is eliminated by recourse to the novel assembly hereinafter described.

Thus, in accordance with the present invention, an electrically conductive cementing composition is provided which is formed by dispersing finely divided highly conductive carbonaceous particles, such as graphite or carbon particles, in an organic binder or cement, which is sufficiently inert to the environmental effects encountered in the operation of an electrolytic cell.

The quantity of finely divided carbonaceous material incorporated in the organic binder, according to the present invention, ranges from approximately 30 percent to approximately 50 percent by weight of the quantity of binder employed.

The size of the finely divided carbonaceous particles incorporated in the organic binder is important to success, and is such that at least 99 percent of the particles will pass through a 20 mesh screen sieve and at least 80% of the particles will be retained on a 200 mesh screen sieve. This particle size distribution is discussed more fully below. Utilization of the weight percentages of carbonaceous particles discussed above in conjunction with this particle size distribution provides for adequate conductivity and low resistance through this bonding material, as well as a high bond strength.

The choice of organic binder or cement will depend upon a variety of factors. Thus, the cement must be compatible with carbon particles, it must have sufficient adhesive strength to provide a suitable bond between the bonded conductors, and, it must be substantially inert to the environmental effects encountered in the operation of the electrolytic cell. Additionally, the cement should be economically attractive from the standpoint of availability and conversion to a bonding composition. The presently contemplated organic binders or cements, which hereinafter will be referred to as chlorinated brine resistant organic cements, are preferably based upon a resin selected from the group consisting of styrene-polyester resins, furane resins and modified epoxy resins.

For a more complete understanding of the invention, reference is made to the drawing in which FIG. 1 is a fragmentary side elevational view in cross section and represents the bottom of an electrolytic cell, of the alkali-chlorine diaphragm type, with the anodes placed therein and the cathode fingers also in place.

Figure 1:
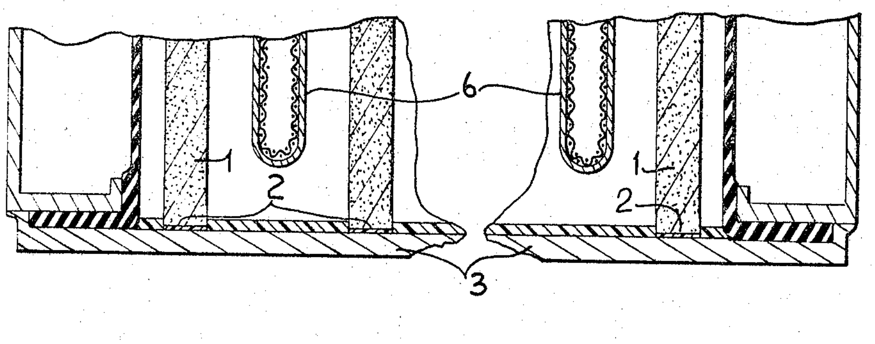

In utilizing the cementing composition of the present invention, the bonds formed are preferably maintained such that the thickness of the joint made is somewhere between about 3 mils to about 25 mils. Joints exceeding these values in thickness increase the ohmage resistance across the joint to an undesirable degree and while in some instances joint strength may be increased by increasing the thickness of a joint the electrical losses across the joint are such that they are undesirable. In similar fashion, utilization of joints below the range recited results in joints which are not satisfactory since adequate tensile strength of the bond between the conductors connected by the joint cannot be readily achieved.

Bonds of extremely high tensile strength measured as shear are provided by utilizing the cementing composition of the present invention and it is not uncommon to experience tensile strengths of the order of 2600 to 2900 pounds per square inch. Bond strengths in the range of from about 100 pounds per square inch to about 1700 pounds per square inch are usually obtained with the subject cementing composition.

unassembled test specimens divided by two (2) gave a measure of the resistance of the bond employing the subject cementing composition. A micrometer was used to measure the bond thickness. The bond strengths were measured by means of an Instron tensile tester.

TABLE I

| Example No. | Cementing Composition | Bond Strength (p.s.i.) | Resistance of Bond (ohms/in.$^2$) | Current Density (amps/in.$^2$) | Bond Thickness ($10^{-3}$ in.) |
|---|---|---|---|---|---|
| 1 | 100 p. Cardolite NC 514, 8 p. Diethylene Triamine, 80 p. Graphite Powder BB4. | 1,310 | .003 | 12.7 | 6.4 |
| 2 | 100 p. Oxiron 2001, 5 p. Propylene Glycol, 35 p. Maleic Anhydride, 100 p. Graphite Powder BB5. | 1,430 | .0068 | 12.7 | 16.5 |
| 3 | 100 p. Epi-Rez 5161, 3 p. $BF_3$-Monoethylamine Complex, 70 p. Graphite Powder BB5. | 1,680 | .0016 | 12.7 | 12.5 |
| 4 | 65 p. Atlac 382E, 35 p. Styrene, 1 p. Benzoyl Peroxide, 70 p. Graphite Powder BB5. | 395 | 0.0076 | 5.1 | 11.3 |
| 5 | 65 p. Atlac 382E, 35 p. Styrene, 2 p. Benzoyl Peroxide, .25 p. N,N-dimethyl Aniline, 70 p. Graphite Powder BB5. | 605 | 0.0139 | 6.4 | 9.7 |
| 6 | 100 p. Brutem 130, 1.5 p. Lupersol DDM, 1.5 p. Cobalt Naphthalene Soln., 100 p. Graphite Powder BB5. | 220 | 0.0010 | 5 | 12.1 |
| 7 | 100 p. Laminac 4107, 1.5 p. Lupersol DDM, 100 p. Graphite Powder BB5. | 280 | 0.0046 | 5 | 10.7 |
| 8 | 100 p. Furane X-2, 14.8 p. Oxiron 2001, 5 p. Catalyst Z-1A, 52 p. Maleic Anhydride, 100 p. Graphite Powder BB5. | 80 | .0010 | 5 | 12.1 |
| 9 | 100 p. Terran Resin, 14.8 p. Oxiron 2001, 4 p. Catalyst 150, 5.2 p. Maleic Anhydride, 100 p. Graphite Powder BB5. | 650 | .0004 | 5 | 12.5 |

The electrical resistance of the bonds prepared from the electrical conductive compositions of the present invention will vary from approximately 0.0003 ohm per square inch to approximately 0.0140 ohm per square inch.

In essence, the electrically conductive cementing compositions of the present invention are prepared by incorporating and thoroughly mixing the carbon particles with fluid resinous material. A suitable curing agent is then added and mixed with the resinous material. Alternatively, the order of addition of the carbonaceous particles and the curing agent may be reversed or they may be added simultaneously. The exact procedure employed will depend upon the particular resins employed. The resulting mixture is then applied in any conventional manner to the conductors to be bonded, and bonding is effected. Advantageously some pressure is used to effect a good bond between the materials being bonded with the subject composition. In general, pressures in the range of from approximately 1 pound per square inch to approximately 400 pounds per square inch are sufficient to effect good bonding.

A clearer understanding of the novel cementing composition may be obtained from the examples given below, which disclose the presently preferred modes of carrying out this invention.

*Examples 1 to 9*

Table I presents the data obtained using the various compositions listed as the electrically conductive cementing composition.

In this laboratory testing the conductive cements were painted upon the end surface of a cylindrical graphite disc or rod 0.5 inch long and 1.0 inch in diameter and this was affixed by means of the bonding composition to the end of a similarly shaped and sized steel rod. The other end of the graphite rod was painted with the conductive composition and this end was affixed to another steel rod. Suitable pressure was then applied to effect a good bond between the various components. The resin was then cured.

Each of the steel discs was provided with an arm having an electrical contact point at the end thereof and extending from the central portion of the disc. After the cementing composition had set, electric current was passed through one disc to the graphite rod, then to the second disc, and the total resistance between the ends of the two discs and the graphite rod was measured. The resistance of each of the steel discs and the graphite rod had been measured prior to assemblying the test specimen. Hence, the difference in resistance between the assembled and In the above Table I, the following abbreviations have been used.

p.=parts by weight
p.s.i.=pounds per square inch
ohms/in.$^2$=ohms per square inch
amps/in.$^2$=amperes per square inch The term "chlorinated brine resistant organic cement" as used in this specification and appended claims is used to define a cementing composition which will still retain its cementing action after being exposed for periods of aproximately two months or longer to laboratory simulated operating conditions such as those which would be encountered in the operation of alkali-chlorine cells of the type disclosed in United States Patents 1,866,065; 2,282,-058; and 2,858,263. In essence these simulated operating conditions consisted of immersing the test material in hot (90° C.) chlorinated brine for the specified period of time.

The preferred chlorinated brine resistant organic cement are based upon a resin selected from the group consisting of styrene-polyester resins, furane resins and modified epoxy resins.

A generalized discussion of various styrene-polyester resins may be found in Chapter XVII of High Polymers, vol. X, "Polymer Processes," C. E. Schildknecht, Ed., Interscience Pub. Inc. (New York), 1956. Particularly useful styrene-polyester resins are the products sold under the trademarks "Atlac 382" and "Brutem 130."

The furane resins are based principally upon the polymers of furfuryl alcohol, polymers of furfuraldehyde and formaldehyde, polymers of furfuryl alcohol and furfuraldehyde and various modifications of these. These types of resins are disclosed and discussed in U.S. Patent 3,043,-804. Particularly useful furane resins are those sold under the trademarks "Furane X-2" and "Terran."

The modified epoxy resins useful in the instant invention include those based upon epoxidized polyolefins, such as those disclosed in U.S. Patents 2,829,135; 2,829,131 and 2,826,556 and available commercially under the trademarks "Oxiron 2001" and "Oxiron 2002"; those based upon a chlorinated bisphenol, such as are sold under the trademarks "Epi-Rez 5161" and "Cardolite NC514."

Permanent setting of all of the above resins is effected by the conventional means known in the art, such as heat or various curing agents. These means are discussed more fully in the references cited above for each of the various resins.

The size of the finely divided graphite particles incorporated in the organic binder is preferably such that at least 99% of the particles will pass through a 20-mesh Tyler screen scale sieve and at least 80% of the particles will be retained on a 200-mesh Tyler screen scale sieve. The above percentages as well as those below and in the appended claims are percentages by weight. A distribution of particle size, as above, gives a bond which has good strength and conductivity.

The screen analysis used to define the size of the graphite particles is based upon the use of Tyler Standard Screen Scale Sieves. Thus, a 20-mesh screen refers to a screen having 20 meshes per lineal inch with a sieve opening of 0.0328 inch or 0.833 millimeter, while a 200-mesh screen refers to a screen having 200 meshes per lineal inch with a sieve opening of 0.0029 inch or 0.074 millimeter. The complete specification for this sieve series may be found on page 856 of Handbook of Chemistry, N. A. Lange, Ed., 1946 edition (Handbook Pub., Inc., Sandusky, Ohio).

These analyses are, of course, made by sieving the entire sample with the sieve having the largest mesh, the portion passing through that sieve being sieved with the sieve having the next smaller mesh.

It is to be understood that any graphite or carbon particles of sufficient conductivity and having the specified size distribution can be used to prepare the novel cementing composition of the present invention. Contamination of the graphite powder with metal oxide impurities is beneficial to a certain extent in achieving low ohmage resistance in the electrical joints. Completely pure graphite powders are useful but not particularly desirable. Just what mechanism provides this enhanced result is not known, but graphite powders having ash contents below 0.1% by weight have not been found particularly effective for utilization in the cementing composition of the present invention. Graphite particles meeting the requirements of conductivity and particle size distribution are available commercially and are sold under the trademarks Graphite No. GP–BB4 and No. GP–BB5.

A typical size analysis of a sample of Graphite No. GP–BB4 indicated the following percentages of material retained upon the standard screen sieve, 1% on 20-mesh, 31% on 35-mesh, 22% on 65-mesh, 10% on 100-mesh, 9% on 150-mesh and 7% on 200-mesh. Thus, a majority of the particles of this sample are between 20-mesh and 100-mesh, with minor proportions being between 100-mesh and 200-mesh, and smaller that 200-mesh. This grade of graphite particles has a maximum ash content of 2% by weight.

A typical size analysis of a sample of Graphite No. GP–BB5, is such that 100% of the particles pass a 35-mesh screen, 62% is retained on a 100-mesh screen, 7% is retained on a 150-mesh screen and 1% is retained on a 200-mesh screen. Thus, a majority of the particles of this sample are between 20-mesh and 100-mesh, and more particularly between 35-mesh and 65-mesh, with minor proportions between 100-mesh and 200-mesh in size, and smaller than 200-mesh in size. The maximum ash content of this grade of graphite particles is 2% by weight.

For a more complete understanding of the invention, reference is made to the drawing, in particular, FIGURE 1, in which there is shown in section an anode assembly of an alkali-chlorine diaphragm cell and cell bottom utilizing the binding composition of the present invention. As can be seen, an electrically conductive bottom 3 is employed to conduct current to the anode structures 1 cemented to the bottom utilizing the bonding composition 2 hereinabove described. Also shown in the figure is the positioning of the cathode fingers 6 and their relationship to the anodes of the cell. This particular cell bottom will have utility in typical Hooker electrolytic diaphragm cells such as described in United States Patent 1,866,065. It is, of course, to be understood that the bonding composition utilized in FIGURE 1 to prepare a novel anode assembly for a conventional diaphragm cell may also be employed in connecting electrical conductors in the filter press or bipolar type alkali-chlorine cells. Typical of cells of this type are the cells described in United States Patents Nos. 2,282,058 and 2,858,263. In the application of the bonding composition to bipolar electrolytic cells, usually flat surfaces of elements having different physical characteristics are bonded together and current is conducted through them. Various mechanical means, such as pressure fits, plugs, screw type connections and various clipping arrangements may be used. By virtue of the present invention, a strong, adherent bond is readily provided for such surfaces, good electrical conductivity across the joint is readily achieved, and mechanical stresses on connections are substantially eliminated.

Figure 2:
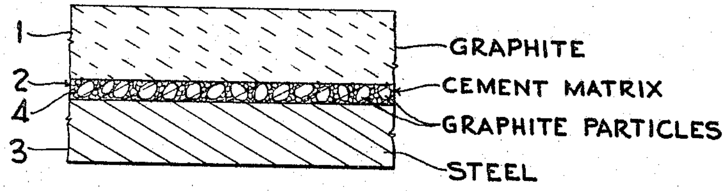
FIG. 2 is an enlarged fragmentary cross sectional view, showing in detail the cementing composition of the present invention utilized to join a steel conductor to a graphite conductor.
Figure 3:
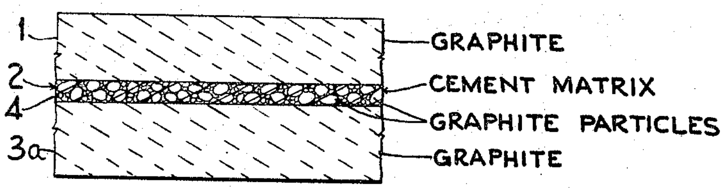
FIG. 3 is an enlarged fragmentary cross sectional view, showing in detail the cementing composition of the present invention utilized to bond graphite to graphite.
Figure 4:
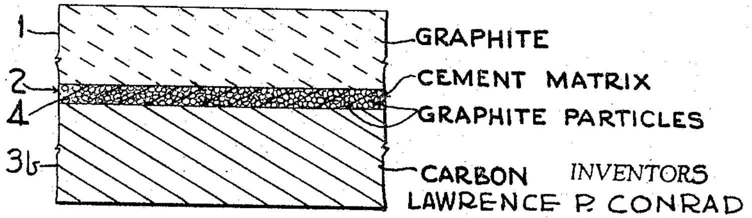
FIG. 4 is an enlarged fragmentary cross sectional view, showing in detail the cementing composition of the present invention utilized to bond graphite to carbon.

FIGURES 2, 3 and 4 show various electrically conductive materials joined together with the bonding composition herein described of the instant invention. In FIGURE 2 a graphite article 1 is shown connected to a steel article 3. The bonding composition 2 is shown in section with the graphite particles 4 of varying size dispersed within the binder of the composition. While steel is shown in the drawing as the metallic surface to which graphite is attached, it will, of course, be understood that other electrically conductive metals may be employed in the place of steel. The metals, such as copper, titanium, platinum, aluminum and the like, may be attached to graphite utilizing the bonding composition herein described, or to other metallic surfaces in lieu of the graphite shown in FIGURE 2.

In FIGURE 3, a modification is shown in which a graphite article 1 is bonded to another graphite article **3*a* utilizing the bonding composition 2 having the carbon particles 4 dispersed therein. The graphite surfaces joined together by such a bond may be identical in their physical characteristics, or may be physically different. Thus, for example, a Karbate type graphite (an epoxy filled graphite) may be bonded to an ordinary electrolytic graphite (electrode graphite) in lieu of the identical graphite articles shown in FIGURE 3. In FIGURE 4, a further modification is shown in which graphite is bonded to a carbon conductor 3*b***.

While the invention has been described with reference to certain specific examples and illustrated embodiments, it is of course to be understood that the invention is not to be thereby limited except insofar as appears in the accompanying claims.

We claim:

1. An electrolytic alkali-chlorine cell having a plurality of anode blades bonded to an electrically conductive surface by means of a layer of an electrically conductive cementing composition comprising a chlorinated brine resistant organic cement having finely divided carbon particles dispersed therein, said carbon particles being present in an amount of from about 30 percent to about 50 percent by weight of the total composition, said carbon particles being of sufficient size so that at least 99 percent will pass through a 20-mesh Tyler standard screen scale sieve and at least 80 percent will be retained on a 200 mesh Tyler standard screen scale sieve, the thickness of said layer being about 3 mils and about 25 mils.

2. The electrolytic alkali-chlorine cell of claim 1, wherein the chlorinated brine resistant organic cement is based upon a resin selected from the group consisting of styrene-polyester resins, furane resins and modified epoxy resins.

3. The electrolytic alkali-chlorine cell of claim 1, wherein the chlorinated brine resistant organic cement is based upon a styrene-polyester resin.

4. The electrolytic alkali-chlorine cell of claim 1, wherein the chlorinated brine resistant organic cement is based upon a furane resin.

5. The electrolytic alkali-chlorine cell of claim 1, wherein the chlorinated brine resistant organic cement is based upon a modified epoxy resin.

6. The electrolytic alkali-chlorine cell of claim 1, wherein the carbon particles are graphite having an ash content greater than 0.1 percent by weight, wherein a major portion of the particles is larger than 100-mesh, a minor portion is between 100-mesh and 200-mesh, and a minor portion is smaller than 200-mesh.

7. The cell of claim 1 in which said anode blades are graphite, and said conductive surface is metallic.

8. An electrical device having two conductive elements bonded together with a layer of an electrically conductive cementing composition comprising a chlorinated brine resistant organic cement having finely divided carbon particles dispersed therein, said carbon particles being present in an amount of from about 30 percent to about 50 percent by weight of the total composition, said carbon particles being of sufficient size so that at least 99 percent will pass through a 20-mesh Tyler standard screen scale sieve and at least 80 percent will be retained on a 200-mesh Tyler standard screen scale sieve, said layer being between about 3 mils and about 25 mils in thickness.

9. The device of claim 8 wherein the carbon particles are graphite having an ash content greater than 0.1 percent by weight, wherein a major portion of the particles is larger than 100-mesh, a minor portion is between 100-mesh and 200-mesh, and a minor portion is smaller than 200-mesh.

10. The device of claim 8 in which said bonded elements are of metal and carbon, and said carbon particles are graphite.

11. The device of claim 8 in which said bonded elements are constructed of carbon.

12. In a process of assemblying an electrolytic alkali-chlorine cell wherein a plurality of anode blades are bonded to an electrically conductive surface, the improvement which comprises effecting said bonding by means of a layer between about 3 mils and about 25 mils in thickness of an electrically conductive cementing composition comprising a chlorinated brine resistant organic cement having finely divided graphite particles dispersed therein, said bonding step being accomplished by applying a pressure upon said layer between said anode blades and said surface of between about 1 and 400 pounds per square inch, and curing said layer, said graphite particles being present in an amount of from about 30 percent to about 50 percent by weight of the total composition and said graphite particles being of sufficient size so that at least 99 percent will pass through a 20-mesh Tyler standard screen scale sieve and at least 80 percent will be retained on a 200-mesh Tyler standard screen scale sieve.

13. The process of claim 12, wherein the chlorinated brine resistant organic cement is based upon a resin selected from the group consisting of styrene-polyester resins, furane resins and modified epoxy resins.

14. The process of claim 12, wherein the chlorinated brine resistant organic cement is based upon a styrene-polyester resin.

15. The process of claim 12, wherein the chlorinated brine resistant organic cement is based upon a furane resin.

16. The process of claim 12, wherein the chlorinated brine resistant organic cement is based upon a modified epoxy resin.

17. The process of claim 13, wherein the carbon particles are graphite having an ash content greater than 0.1 percent by weight, wherein a major portion of the particles is larger than 100-mesh, a minor portion is between 100-mesh and 200-mesh, and a minor portion is smaller than 200-mesh.

References Cited

UNITED STATES PATENTS

| | | | |
|---|---|---|---|
| 2,470,073 | 5/1949 | Low | 204—266 |
| 2,795,680 | 6/1957 | Peck | 252—511 |
| 3,020,220 | 2/1962 | Helling et al. | 204—294 |
| 3,046,216 | 7/1962 | Lowe | 204—294 |
| 3,072,558 | 1/1963 | Myers et al. | 204—294 |

FOREIGN PATENTS

| | | |
|---|---|---|
| 1,080,982 | 6/1954 | France. |

JOHN H. MACK, *Primary Examiner.*

D. R. JORDAN, *Assistant Examiner.*

UNITED STATES PATENT OFFICE

CERTIFICATE OF CORRECTION

Patent No. 3,334,040 August 1, 1967

Lawrence P. Conrad et al.

It is hereby certified that error appears in the above numbered patent requiring correction and that the said Letters Patent should read as corrected below.

Column 6, line 58, after "being" insert -- between --.

Signed and sealed this 1st day of October 1968.

(SEAL)
Attest:

Edward M. Fletcher, Jr.
Attesting Officer

EDWARD J. BRENNER
Commissioner of Patents